April 27, 1954  B. A. HOOK ET AL  2,676,632
APPARATUS FOR SEPARATING SKIN FROM FRUIT
Filed Sept. 14, 1949  3 Sheets-Sheet 1
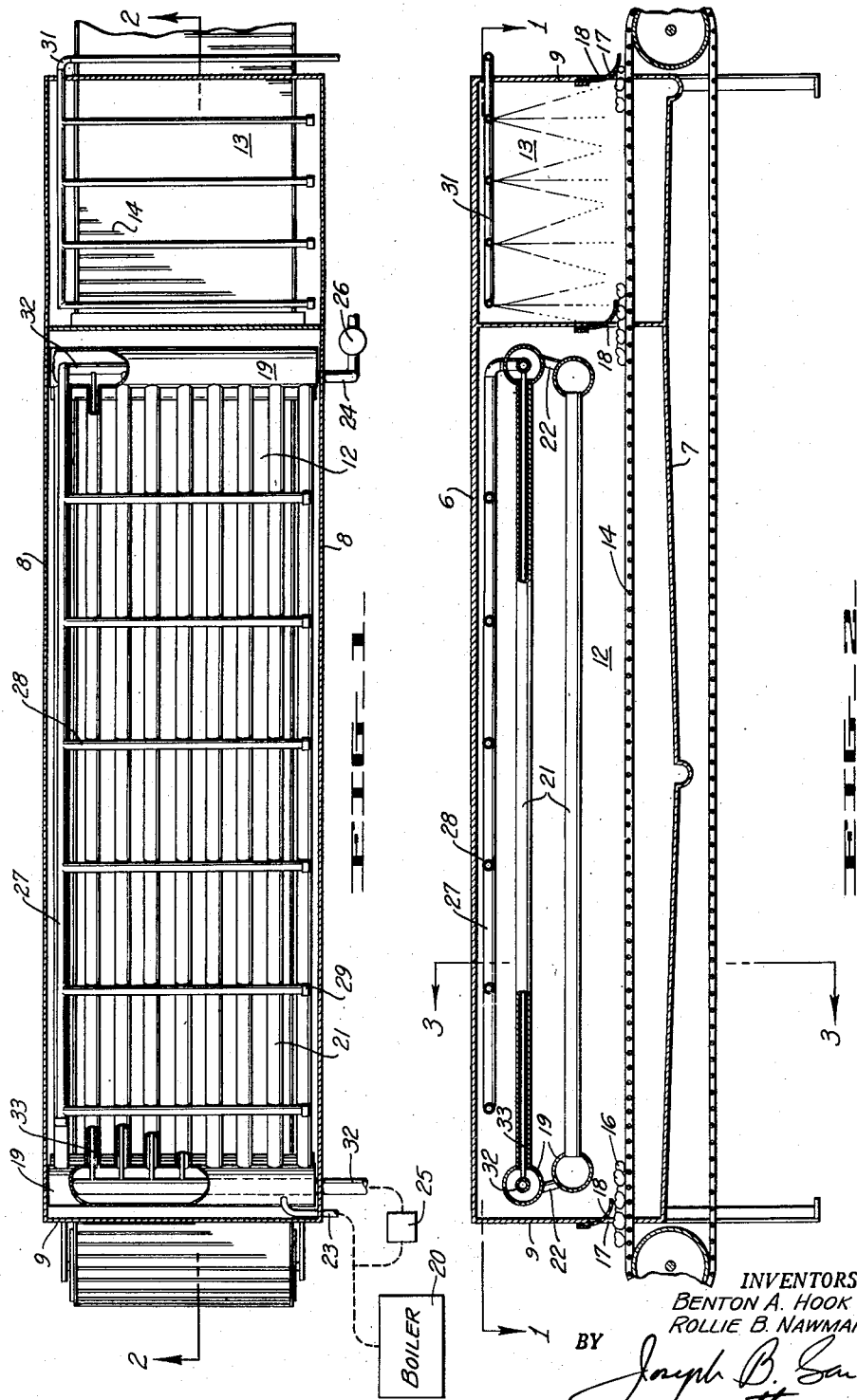
INVENTORS.
BENTON A. HOOK
ROLLIE B. NAWMAN
BY

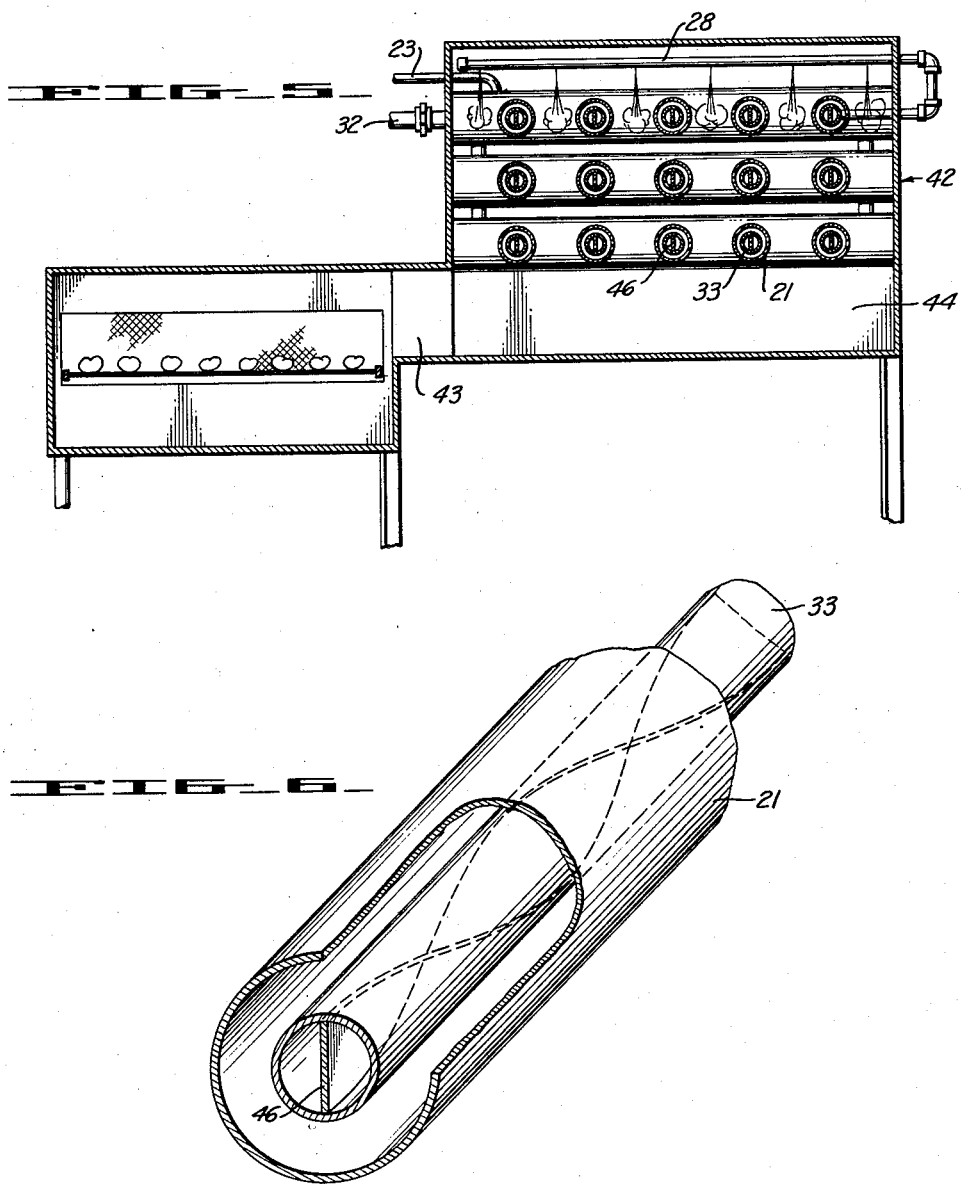

Patented Apr. 27, 1954

2,676,632

UNITED STATES PATENT OFFICE 2,676,632

APPARATUS FOR SEPARATING SKIN FROM FRUIT

Benton A. Hook and Rollie B. Nawman, Oakland, Calif., assignors to Benner-Nawman, Inc., Oakland, Calif., a corporation of California Application September 14, 1949, Serial No. 115,748

5 Claims. (Cl. 146—47)

1

This invention relates to apparatus used in the process of "slip-peeling" fruit or vegetables, the structures herein shown and described constituting improvements over the apparatus of a similar nature disclosed in the application of Benton A. Hook, Serial No. 14,947, filed March 15, 1948, now abandoned.

An important object of the invention is to provide in connection with apparatus for the "slip-peeling" of fruit or vegetables, an improved heat generator unit in which steam, maintained at sufficiently low pressure to preclude overcooking or deep heat penetration of the fruit or vegetables by forcible surface impingement of the steam thereon, is raised to unusually high temperature at atmospheric pressure so that "slip-peeling" may be accomplished in the shortest interval of exposure of the fruit or vegetables to the steam.

Another object of the present invention is to provide improved apparatus in which objects such as fruits or vegetables may be subjected to controlled conditions of atmospheric heat and moisture to effect detachment of normally tenaciously clinging outer skin or peel from the objects without substantially affecting the subjacent flesh portions of the latter.

Another important object of the invention is to provide apparatus of the class described, including a treatment chamber for enclosing objects to be treated and having therein a heat radiator remotely situated relative to the objects, in which means is provided for effecting efficient conduction of heat from the radiator to the objects along a transmission path whose conduction characteristics may be selectively varied to correspondingly vary the treatment conditions to which the objects are subjected.

A further object of the invention is to provide apparatus of the character referred to in which detachment of the skin or peel of fruit or vegetables is effected by enclosure of the latter for prescribed periods in a heated vaporous ambient atmosphere and in which condensation, which occurs on the surface of the object under treatment is rapidly wiped off so as to hasten heat penetration of the skin or peel and to protect the object against objectionable slow heating and accompanying deep heat penetration in the peripheral area thereof subjacent to the detached skin or peel.

It is another object of the invention to provide, in apparatus of the general class above set forth, a chamber in which fluid, to subsequently become the ambient atmosphere for enclosing

2 and for effecting loosening of the skins or peels of the objects to be excoriated, is preconditioned to establish conditions of temperature and moisture content and is subsequently discharged to engulf the aforesaid objects which are positioned in proximity to and exteriorly of the chamber.

An additional object of the invention is to provide apparatus of the character described, which includes a chamber, in which a file of fruit or vegetables to be excoriated may be advanced, and jets for directing flows of heated and vaporous fluid toward and to enclose the advancing file, in which is further included radiators heated to an elevated temperature and to which said fluid is exposed both before and subsequent to issuance through the jets.

It is a further object of the invention to provide improved means for superheating the atmosphere of processing chambers of the character described.

It is a still further object of the invention to provide processing apparatus of the character described capable of marked economical operation.

Still another object of the invention is to provide apparatus of the character described, including a processing space for containing objects to be treated in which temperatures are avoided which will scorch or effect undesirable spot heating and localized deep thermal penetration of the objects.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 1 is a top plan view of apparatus, embodying the improvements of our invention, for detaching skin or peel from fruit or vegetables. The top cover portion of the apparatus is removed so as to more clearly disclose details of internal construction.

Figure 2 is a vertical sectional view taken in the plane indicated by the line 2—2 of Figure 1, the top cover portion of the apparatus being shown in place.

Figure 5 is a vertical sectional view of a modified form of high temperature steam generator.

Figure 6 is a perspective of a portion of the steam heater apparatus and illustrating specific internal details of construction thereof.

Figure 3:
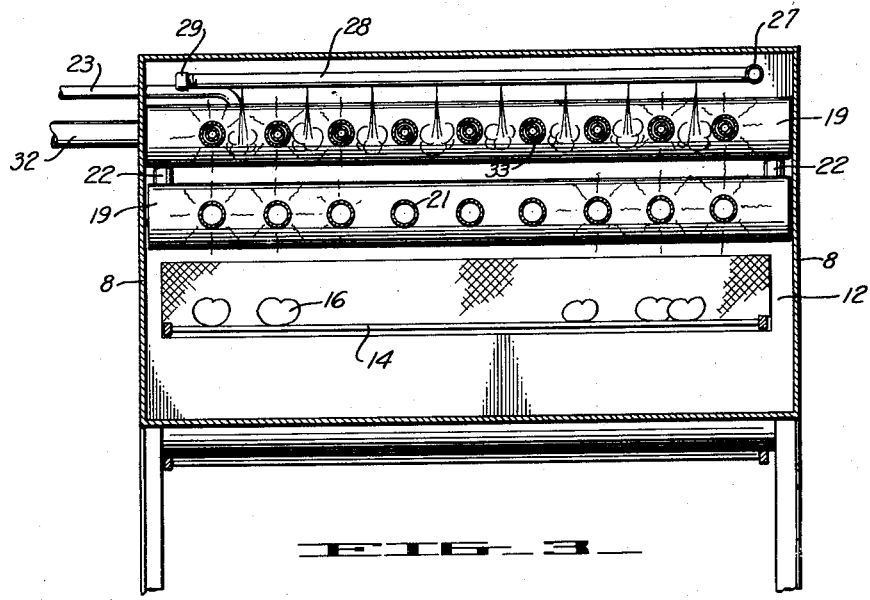
Figure 3 is an enlarged scale vertical sectional view taken in the plane indicated by the line 3—3 of Figure 2.

Various attempts have been made in the past to effect loosening of the skins of fruits or vegetables by the use of steam discharged into a chamber containing the articles to be processed, the object being to subject the skins or peels of the latter to a high temperature scalding action for a designated period required to effect blistering and resulting separation of the surface coverings from the subjacent flesh portion of the articles. Due to the high temperatures required which are usually impossible to secure in the atmospheric pressure of the chamber, the majority of the aforesaid attempts at securing satisfactory operation have been made with the use of highly superheated steam allowed to discharge onto the surfaces of the articles at close enough range to bring the said surfaces to proper temperature in a reasonable time and in the face of considerable heat losses due to expansion and condensation of the steam in the chamber. This means that in order to adequately bathe the article in steam, the article must be passed between opposed nozzles with the result that those portions of the article surface closest to the nozzles which may be aptly described as the polar regions, are heated to a much higher degree than will be the equatorial region. This disparity in surface temperature may lead to insufficient loosening of the surface covering in the said equatorial region or, if the steam temperature is increased to counteract the deficiency, scorching or deep heat penetration of the flesh in the aforesaid polar regions may ensue. Also any slight variations in the relative sizes of the successive articles introduced into the chamber obviously would change the nozzle spacing relationship with the articles and thus might cause undesirable increases or decreases of surface temperatures on the articles.

In the aforementioned prior application of Benton A. Hook, the fruit or vegetables of which the skin or peel is to be blistered and loosened subsequent to the so-called "slip-peeling" thereof, are passed through a chamber in which is provided an atmosphere maintained at a desired degree of moisture content by jets of saturated steam which are caused to approach and encompass the objects being processed after passing through an intermediate zone heated by radiation from coils containing heating fluid, the jet steam being thereby superheated and arriving at the vicinity of the objects to be treated at a much higher temperature than could be secured in the atmosphere by only using ordinary saturated or superheated steam. The end result is that the fruit or vegetables will be engulfed in ambient vapor at such temperature and density as is conducive to the rapid blistering and separation of the skin or peel from the subjacent zone of fruit or vegetable flesh with a minimum degree of cooking of the flesh in said zone. In such apparatus, the initially moisture-laden steam of the jet streams, in flowing past the highly heated radiators, will be superheated and progressively dried but will still retain sufficient moisture to provide for superior heat conduction between the radiators and the objects under treatment. An outstanding feature of operation in the said apparatus is that the jet steam upon approaching the cooler fruit or vegetables entering the chamber, serves to break through and wipe off large amounts of the deposited surface layer of condensate, any smaller amounts of remaining moisture thereafter evaporating in the heated atmosphere. This rapid application of heat protects the fruit or vegetable flesh against overcooking but at the same time, permits sufficient penetration by scalding action so that the skin or peel may be blistered and satisfactorily loosened from the subjacent flesh.

In order to effect greater economies of operation and greater flexibility of heat control in the delivery of temperatures above 212 degrees Fahrenheit at atmospheric pressure to the objects under treatment within the processing chamber, we have developed the hereinafter disclosed improvements to the basic Hook structure. The said basic apparatus comprises an elongated housing formed of relatively parallel top and bottom walls 6 and 7, respectively, conjoined with edgewise vertical side and end walls 8 and 9 which, together define and enclose a processing chamber 12. An endless, preferably open mesh or ladder type belt 14, serving as a conveyor for the fruit or vegetables 16 to be treated, extends entirely through the chamber 12, ingress and egress to and from the latter being effected through suitable openings 17 in the end walls 9. In order to provide for as efficient sealing of the chamber as possible during movement of the objects to be treated and their carrier belt through the respective openings, flexible flaps 18 are provided which are swingable to close the openings at all times regardless of whether objects may or may not be passing therethrough. The belt 14 is so positioned that it extends horizontally across the lower portions of the chamber near the bottom plate 7 thereof, the space under the belt being provided so that all surface portions of the objects carried by the belt will be equally exposed to atmospheric conditions within the chamber.

In the present design of the apparatus we provide a second chamber 13 adjacent an end of the housing which may be conveniently formed by placing a partition member 11 intermediate the end walls 9 and in which jets of cold water may be sprayed from overhead ducts 31 on the processed objects as the latter emerge from the chamber 12 in order to expedite heat dissipation from the objects and to facilitate subsequent manual handling thereof.

In the larger space of the chamber 12 above the carrier belt 14 is provided a heat radiator which preferably comprises superposed groups of header pipes 19 arranged, axially, transversely of the chamber 12 adjacent the opposite ends thereof, relatively parallel and spaced radiator tubes 21 being secured at their ends in communicating relationship with the header pipes and extending longitudinally of the latter chamber preferably in separate vertically spaced layers. Jumper ducts 22 are provided interconnecting vertically adjacent header pipes 19, an inlet pipe 23 being further provided for introducing steam from a suitable remote source into one of the header pipes and an exhaust pipe 24 being additionally connected to an opposite and relatively lower header pipe through which steam may pass to be controlled by a thermostatically responsive valve or trap 26 for governing steam flow and the temperature thereof in the radiator tubes 21.

Along the upper longitudinal portion of the chamber 12 extends a supply header pipe 27 from which projects a plurality of relatively parallel and spaced distributing ducts 28 lying transversely across and above the upper layer of radiator tubes 21 and having axially vertical apertures in the lower peripheral portions thereof through which fluid, preferably steam, may be projected in downwardly directed jets past the layers of radiator tubes 21 and preferably with enough force to cause sufficient turbulence in the chamber atmosphere so that heated vapor will be evenly distributed throughout the zones including the belt 14 and the chamber space below the latter, to completely encompass the fruit or vegetable on the belt in so doing. The respective distributing ducts 28 are, preferably, closed at the ends thereof opposite the header pipe by pipe caps 29 or plugs so that substantially all fluid entering the ducts 28 will be discharged therefrom in the aforesaid jets. The steam used in the jets may be either of the saturated or superheated variety, provided that it is not so dry that, upon impinging against or encompassing the fruit or vegetables, it will tend to scorch or dehydrate the peel or skin, it being desirable that the steam have such a vapor content that scalding and subsequent blistering of the peel or skin will occur rather than a rapid drying out thereof.

Disposed preferably within and extending axially longitudinally of the header pipes 19 at the ends of at least one layer of the radiator tubes 21, are distribution ducts 32 interconnected by pipes 33 which run preferably concentrically through the radiator tubes 21, one of the distribution ducts 32 being connected with the inlet pipe 23 extended exteriorly of the chamber 12 and further connected directly to the boiler 20 and the other distribution duct being connected in flow communication with the header pipe 27. Steam preferably within a range of 2 to 20 p. s. i. and at a temperature of from about 215 to 250 degrees Fahrenheit is admitted into the exteriorly exposed distribution duct 32 while a comparatively gaseous medium which may be superheated or saturated steam, or combustion gas, at a temperature within the range of 300 to 365 degrees Fahrenheit is admitted into the inlet pipe 23. It has been found to be in the best interests of operational economy to derive the steam necessary for the operation of the radiator tubes and the steam jets from the same source, here shown as a boiler 20 from which high pressure and high temperature saturated steam is led directly to the radiator tubes 21 and to a suitable pressure reducing valve 25 from the discharge of which the steam necessary to supply the jets is derived. The principal object in using the low pressure steam in the jets is to avoid excessive velocities which might impinge against the objects with such force as to possibly rupture the skin thereof and tear the flesh or probably cause undesirable deep heat penetration and cooking of the flesh in localized areas thereof. The arrangement of the parts is such that the steam jets discharged from the distributing ducts 28 pass downwardly between the radiator tubes 21 prior to encompassing the fruit or vegetables carried thereunder by the conveyor belt 14. Due to the high temperature existing in the radiator tubes 21, a highly heated atmosphere will exist around the tubes as a result of thermal radiation from the latter. In addition to this, the steam flowing through the pipe 33 within the radiator tubes will also absorb considerable heat radiated inwardly from the ambient zone of the hotter steam or gases flowing in the radiator tubes with the result that the steam issuing in the jet streams from the distribution ducts 28 will be at a much higher temperature than the incoming jet steam admitted from the supply source through the inlet duct 32.

The steam directed downwardly as the jet streams from the distributor duct 28, will lose temperature due to expansion upon issuing from the jet orifices into the atmospheric pressure of the chamber 12. Actual tests have shown that, in the case of saturated steam discharged into the chamber from the jets, the discharged steam will very rapidly drop to about 212 degrees Fahrenheit, and upon contacting the cooler fruit or vegetables which have only recently entered the chamber and which are substantially at outside room temperature, a surface temperature as low as 180 degrees Fahrenheit may be secured on the objects in the time allotted to normally complete the skin or peel loosening operation. However, upon passing through the heated zones around the radiator tubes 21 the partially cooled jet steam will be superheated to a high temperature of a value dependent upon the degree of heat absorption with the result that thermal losses may be counteracted which are suffered during passage of the steam from the jets into engagement with the objects under treatment, or the steam may be caused to arrive in the zone of treatment of the objects at a much higher temperature than it possessed prior to being discharged from the jets. By proper regulation of the pressures and/or temperatures of the steam in the jet supply lines and the heating fluid in the radiator tubes, the ultimate temperature of the jet steam delivered to the immediate vicinity of the objects under treatment, as well as the vapor density of the steam, may be selectively controlled. These adjustments have a direct bearing upon and affect the efficiency of operation of the apparatus. The conductivity of the heat transmission path from the radiator tubes 21 to the fruit or other object carried by the conveyor belt 14 depends upon the vapor density in the chamber 12, a large amount of moisture contained in the jet steam or the existence of reevaporated condensate in the chamber being conducive to transference of large amounts of heat to the belt-borne objects while drier jet steam will transmit a much lesser degree of heat. Since the moisture content of the jet steam is directly proportionate to its temperature and pressure, when saturated steam is used, it will be seen that the degree of surface condensation of the jet steam on the fruit or vegetables and also the thermal conductivity of the jet streams may be controlled by variations in the pressure of the saturated steam supplied to the jets and in the temperature existing in the radiator tubes. In the case of some fruits or vegetables it may be desirable, by the use of comparatively wet jet steam, to so coat the surface of the object under treatment that the temperature rise of the object will be retarded during subsequent evaporation of the condensate layer and terefore the skin zone of the object will be gradually raised to skin separation temperature without causing damaging and deep thermal penetration of the fruit or vegetable flesh which might cause undesirable overcooking thereof subjacent to the skin or peel. In the case of other fruit or vegetables it may be desirable not to so retard the skin loosening by the exposure of the fruit or vegetables, to more intense although not completely dry heat. This may be done either by raising the temperature in the radiator tubes or by raising the pressure and/or temperature of the jet steam which will result in the latter being applied in a drier form to the objects so that the surface condensation and evaporation cycle is shortened and the ambient temperature of the chamber may more rapidly act to scald and loosen the skin or peel.

It is possible, in the apparatus of our invention, to obtain temperatures surrounding the fruit or vegetables being processed which are much higher than can ordinarily be obtained by the discharge of steam into the atmosphere. With the radiator tubes 21 heated by superheated steam, combustion gases or by other means to an operating temperature in the range of 300 to 325 degrees Fahrenheit, and with saturated or superheated steam within the range of about 2 to 20 p. s. i. in the jet supply line, it is possible to obtain temperatures of the jet steam in the immediate ambient vicinity of the fruit or vegetables under treatment, due to thermal absorption thereby of heat units in passing through the radiantly heated spaces surrounding the radiator tubes, which may range from 212 to as much as 300 degrees Fahrenheit. The degree of such heat absorption by the jet steam depends upon the vapor content of the latter and the said vapor content is affected by heat transfer taking place in the portion of the radiator tube unit through which pass the pipes 33 carrying the steam supplying the jets. It is possible therefore to vary the ambient temperature around the objects under treatment by changing the pressure and/or temperature of the jet steam while maintaining the radiator tube temperature at a substantially constant value, by regulating the radiator tube temperature while maintaining a prescribed pressure and/or temperature in the jet supply system, or by combined adjustments of each of the jet supply and radiator tube heating systems. Such adjustments, of course, have a bearing upon the length of the processing chamber 12 and the linear velocity of the conveyor belt 14 which govern the interval of time in which the fruit or vegetables are subjected to the elevated temperatures of the chamber. When the fruit or vegetables at room temperature first enter the chamber, their cooler surfaces will effect an immediate condensation thereon of steam vapor which, as the conveyor belt advances, will be progressively evaporated until the surfaces reach the temperature of the ambient chamber atmosphere, in the range aforesaid of from 212 to 300 degrees Fahrenheit, which is then maintained during the remainder of belt travel through the chamber to effect satisfactory detachment of the skin or peel. Evaporation of the surface condensation will protect the fruit or vegetable against rapid scorching or dehydration of the peel or skin and absorption of heat which might tend to cook the flesh deeply below the surface thereby destroying the texture of the flesh and materially reducing the commercial grade of the product. In the processing of thin skinned fruits and vegetables such as peaches, pears and tomatoes, it is essential that the utmost protection be afforded therefor against the possibility of overcooking, therefore a jet steam having comparatively high moisture content and reduced temperature should be employed so as to extend the condensate evaporation period as far as necessary to prevent excessive heating before the fruit or vegetable completes traversal of the chamber. In the case of thicker skinned articles such as oranges and other citrus fruits, the jet steam may be much hotter and drier since such deep penetration of the skin is necessary before the latter can be satisfactorily loosened.

In the above described apparatus of our invention, the securing of ideal atmospheric operating conditions in the processing chamber is more readily realized due to the elimination of the usual excessive temperature drop in the jet steam as the latter is released into the atmospheric pressure of the chamber, and by the creation of sufficient turbulence in the vaporous chamber atmosphere which insures an even distribution of heat over the entire surface of the objects under treatment. The present structural arrangement in a large measure anticipates such losses by repeatedly bringing the jet steam in a reflex action under the influence of the hotter radiator tube temperature, first by directing the jet steam through the tubes so as to absorb heat radiated inwardly therefrom and subsequently causing the jet steam to flow through the heated fields around the tubes created by external radiation from the latter. Thus, raising the jet steam to its ultimate temperature is not effected by heat transfer within the chamber alone, but rather a large initial rise in temperature is imparted to the steam before the latter is discharged from the jets. The fact that both the heating and jet supplies are derived from the same boiler source and the heating of the lower pressure jet steam is effected by the higher pressure boiler steam, makes for greater economies in operation and simplified apparatus to produce such results.

Figure 4:
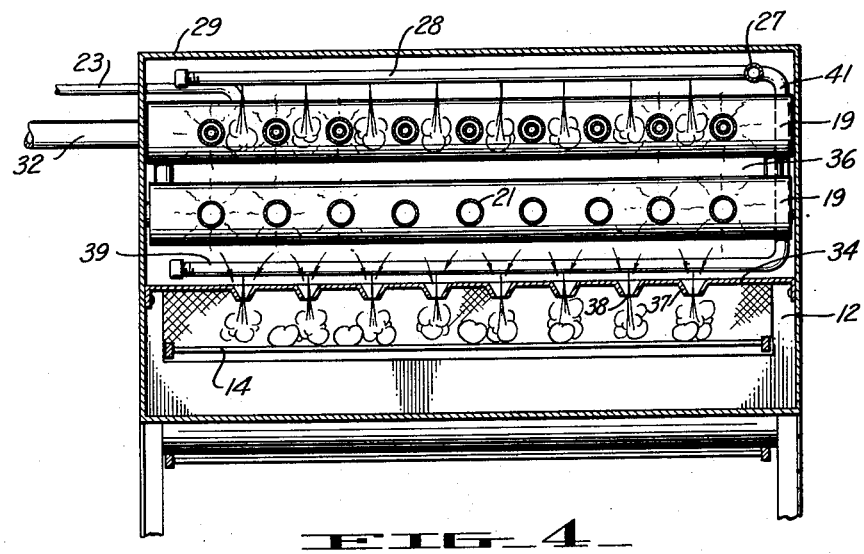
Figure 4 is a view similar to Figure 3, showing a modified form of skin separating apparatus.

In Figure 4 is shown a modified form of structure designed to deliver to and engulf the articles under treatment in a heated atmosphere of sufficient moisture content to effect satisfactory loosening of the peel or skin without causing scorching or dehydration of the latter or deep heat penetration and cooking of the underlying flesh portions of the fruit or vegetables. As here shown, the basic parts of the structure are substantially identical with those previously described and bear corresponding reference numerals. Spaced sufficiently above the conveyor belt 14 to provide adequate clearance for the articles borne by the belt to pass thereunder is a plate 34 forming the bottom closure of a steam conditioning chamber 36 containing the jet pipes 28 and the heat radiator tubes 21, the plate 34 being provided throughout its horizontal surface area with a plurality of downwardly convergent conically-shaped nozzles 37 through the jet apertures 38 of which steam from within the chamber 36 may be discharged to enclose the articles passing thereunder on the conveyor belt 14. A sufficient number of header pipes 39, to cover a length of the conveyor belt which will afford adequate treatment area in proportion to linear advancement of the belt, are provided and are arranged to extend above and across groups of the nozzles 37 aligned transversely of the chamber 36, the header pipe 39 being equipped with jet openings aligned with and above the nozzles. The pipes 39 are connected by a feed line 41 with the jet header 27 so that steam supplied by the latter will be projected downwardly through the nozzles to enclose the articles carried on the underlying conveyor belt. As steam is discharged from the overhead jet pipes 28 the former passes, as previously explained, downwardly past the radiator tubes 21 thereby absorbing heat and eventually raising the internal temperature within the chamber 36 to a degree considerably above 212 degrees Fahrenheit. Simultaneously, the steam jets issuing from the pipes 39 in flowing downwardly through the convergent nozzles 37 will effect an ejector action drawing the highly heated steam from the chamber 36 downwardly through the apertures 38 in sufficient volume to completely enclose the articles on the belt 14. By regulation of the heat radiated from the tubes 21 and the temperatures of the jets issuing from the upper and lower jet pipes 28 and 39 it is possible to create a very hot ambient atmosphere around the articles with the result that rapid blistering and loosening of the skin or peel will be effected before the heat can penetrate deeply enough into the flesh of the article as to undesirably cook the latter and reduce its grade value.

Figure 5 illustrates a still further modified form of structure capable of effecting satisfactory slip peeling of fruit or vegetables. As here shown a separate housing 42, disposed adjacent to or mounted on the housing enclosing the processing chamber 12, contains the overhead jet pipes 28 and the heat radiator tubes 21 equivalent to those above described and is connected to the chamber 12 by means of a large sized duct 43 through which steam conditioned in the chamber 44 of the housing 42 may flow into the chamber 12. The pressure generated in the chamber 44 by the discharge of steam thereinto from the jet headers 28 is usually sufficient to effect forcible flow of the steam into the processing chamber 12 but, if desired, a blower may be provided in association with the housing 42 so as to expedite the steam flow. The duct 43 is positioned to discharge preferably along a side of the conveyor belt 14 so that at least a longitudinal section of the latter and the articles carried thereby will be completely engulfed in the hot steam atmosphere. Temperatures and vapor content of the steam surrounding the articles may be maintained in the desired degrees to effect the most efficient slip peeling of the articles by the regulation of the jet steam and radiator tube temperatures as previously explained.

Figure 6 illustrates a modified form of construction for the portions of the heat radiator tubes 21 arranged to effect heat transfer through the feed pipes 33 to the jet steam contained within the latter. Within the ducts which carry the comparatively high velocity fluid, in this case the pipes 33, is placed a preferably continuous helically-shaped sheet metal guide vane 46 which, being engaged by the flowing fluid will cause the latter to move in the combination of axial and rotational directions along the pipes thereby substantially elongating the travel path of the fluid, over what it would normally be if allowed to move linearly through the pipes, so as to effect maximum and uniform distribution of heat in the moving fluid from the bordering heating medium. To further enhance such heat transfer, the pipes 33, and the guide vane 46 if desired, may be made of comparatively thin-walled tubing preferably copper or other metal having high heat transmission characteristics.

Although the foregoing description of our invention is directed mainly to the procedure of skin or rind removal from fruits or vegetables, it will be apparent to those skilled in the art that by suitable regulation in the apparatus of pressures, temperatures, moisture conditions and the length of time that articles to be processed are exposed to the hot chamber atmosphere, other operations such as exhausting and/or cooking of the articles may be accomplished.

We claim:

1. Apparatus for effecting heat separation of surface coverings from articles such as fruit and the like comprising a housing enclosing a chamber, plate-like means including a plurality of openings dividing said chamber into upper and lower portions, conveyor means movable through and for supporting articles in said lower chamber, a steam supply duct in said upper chamber provided with an orifice disposed in spaced relation to said conveyor and through which a flow of steam may be downwardly discharged into the atmosphere of said upper chamber and along a path across the latter, an internally heated radiator tube in said upper chamber disposed intermediate the conveyor and orifice and having a field of thermal radiation embracing a portion of said steam flow path for effecting heat transfer from said radiator tube to the steam in said flow path, a portion of said supply duct being in heat transfer relationship with said radiator tube whereby said steam will be heated prior to discharge thereof through said orifice, and steam injector means in said upper chamber overlying said openings for drawing the atmosphere from said upper chamber downwardly through said openings to encompass said articles in the lower chamber.

2. Apparatus for effecting heat separation of surface coverings from articles such as fruit and the like comprising a housing enclosing a chamber, conveyor means movable through and for supporting articles in a bottom portion of said chamber, a supply duct for steam in said chamber provided with an orifice disposed in an upper portion of the chamber and through which a flow of steam may be directed along a path across the chamber to encompass articles on said conveyor means, a plurality of radiator tubes in said chamber and arranged intermediate said orifices and conveyor means and lying axially traversely to said steam flow path whereby the fields of thermal radiation of said radiator tubes will embrace longitudinally spaced portions of said flow, a portion of said supply duct being disposed concentrically within one of said radiator tubes whereby heat transfer will be effected between the latter radiator tube and the steam in said supply duct prior to discharge of said steam through said orifice, means for delivering steam to said radiator tubes, and means for delivering steam to said supply duct.

3. Apparatus for effecting heat separation of surface coverings from articles such as fruit and the like comprising a housing enclosing a longitudinally extending chamber, conveyor means substantially horizontally disposed and movable longitudinally through said chamber for carrying articles to be treated through said chamber, heat radiator means in said chamber above said conveyor means, said radiator means comprising a plurality of header pipes and spaced radiator tubes extending substantially longitudinally of said chamber communicating with said header pipes, means for introducing steam into said radiator means, second heat radiator means positioned in said chamber adjacent the top thereof and above said first radiator means comprising a plurality of spaced ducts extending substantially transversely in said chamber and having downwardly directed apertures through which steam may be projected past said first heat radiator means onto the articles on said conveyor means, a pipe concentrically positioned within each of a plurality of said longitudinally extending radiator tubes of said first radiator means, means connecting all of said pipes with said second heat radiator means and with a supply of steam at a lower pressure and temperature than the steam supplied to said first heat radiator means whereby the jets of steam directed downwardly on said articles do not have excessive velocity to damage said articles but are of sufficient temperature due to travel within said radiator tubes and the highly heated atmosphere created by said first radiator means between and around which said jets pass before striking said articles.

4. Apparatus for effecting heat separation of surface coverings from articles such as fruit and the like comprising a housing enclosing a longitudinally extending chamber, conveyor means substantially horizontally disposed and movable longitudinally through said chamber for carrying articles to be treated through said chamber, said conveyor means being positioned adjacent the bottom of said chamber but raised slightly therefrom so that all surface portions of the articles may be treated, heat radiator means in said chamber above said conveyor means, said radiator means comprising a plurality of header pipes arranged at opposite ends of said chamber and transversely therein, spaced and parallel radiator tubes extending substantially longitudinally of said chamber communicating with said header pipes, means for introducing steam into said radiator means, second heat radiator means positioned in said chamber adjacent the top thereof and above said first radiator means comprising a plurality of spaced ducts extending substantially transversely in said chamber and having downwardly directed apertures through which steam may be projected past said first heat radiator means onto the articles on said conveyor means, a pipe concentrically positioned within each of a plurality of said longitudinally extending radiator tubes of said first radiator means, means connecting all of said pipes with said second heat radiator means and with a supply of steam at a lower pressure and temperature than the steam supplied to said first heat radiator means whereby the jets of steam directed downwardly on said articles do not have excessive velocity to damage said articles but are of sufficient temperature due to travel within said radiator tubes and the highly heated atmosphere created by said first radiator means between and around which said jets pass before striking said articles.

5. Apparatus for effecting heat separation of surface coverings from articles such as fruit and the like comprising a housing enclosing a chamber, conveyor means movable therethrough and for supporting articles in said chamber, a supply duct for steam in an upper part of said chamber provided with downwardly directed orifice means through which a flow of steam may be directed to encompass articles on said conveyor means, at least one radiator tube in said chamber and arranged intermediate said orifice means and conveyor means, a steam supply pipe connected with said supply duct and being disposed within said radiator tube.

References Cited in the file of this patent

UNITED STATES PATENTS

| Number | Name | Date |
| --- | --- | --- |
| 887,628 | Hall | May 12, 1908 |
| 1,423,421 | Harding | July 18, 1922 |
| 1,743,989 | Wainwright | Jan. 14, 1930 |
| 1,753,902 | Nevills | Apr. 8, 1930 |
| 2,122,021 | Beckwith | June 28, 1938 |
| 2,376,839 | Wansker | May 22, 1945 |
| 2,464,119 | Dawson | Mar. 8, 1949 |